Dec. 6, 1955    H. R. B. FENBY    2,726,020
TURNING OR CREASING MACHINE
Filed July 6, 1953    5 Sheets-Sheet 5

Inventor:
Hyban Roy Beverley Fenby

United States Patent Office

2,726,020
Patented Dec. 6, 1955

2,726,020

TURNING OR CREASING MACHINE

Hyban Roy Beverley Fenby, Birmingham, England, assignor of one-half to Wallwin (Turning Machines) Limited, Warwick, England, a British company Application July 6, 1953, Serial No. 366,261

10 Claims. (Cl. 223—38)

This invention relates to turning machines or ironing presses for turning or creasing the edges of material that has been cut to shape such as in the making of collars, neck bands, cuffs, pockets and like parts of garments or accessories therefor, the turned or creased material being subsequently sewn to provide the finished article.

Hitherto in turning machines the material has been turned about a shaper plate or die having a contour formed to the desired shape of the article in the flat condition, said die or shaper plate being arranged to clamp the material against a hot plate through an opening of complementary form to the shaper plate in an assembly of movable turning members which operate in timed relation with the shaper plate to turn the edges of the material over the latter. Upon the turning members retracting the shaper plate is withdrawn with the material turned about it which material is subsequently removed.

In order to assist removal of the material without unduly disturbing the turned edges the shaper plate has been built up of a series of movable plates so that the shaper plate as a whole can be contracted.

The object of the present invenion is to provide an improved turning or creasing machine wherein a more sharply defined turn or creasing of the material is obtained whilst in the case of a turning machine the latter is considerably simplified by the elimination or reduction of the number of turning members and the necessity of a fixed or contractible shaper plate adapted to have the material turned over its edges is obviated.

In carrying the present invention into practice two embodiments are described, firstly a machine wherein the hot plate is arranged to have a yielding movement and secondly a machine in which the hot plate is fixed.

In the case of the first described machine this is shown as for manual operation whilst the second machine incorporates cam mechanism suitable for power operation.

However, the dies and hot plate (where movable) may be operated in timed relationship in various ways for the purposes of effecting the trapping or pinching action in accordance with this invention.

Both machines also feature an arrangement of dies and operating or driving mechanism wherein the trapping or pinching action is carried out in two stages to effect the desired turning or creasing whereby neat folding of the turned edge portions of the material is obtained at corners.

By the provision of suitably shaped male and female dies the machines may be used for the creasing or turning of cut pieces of material in the manufacture of collars, neck bands, cuffs and the like but in the examples shown the machine is set up for the turning of pockets from appropriately shaped blanks of material.

Figure 1:
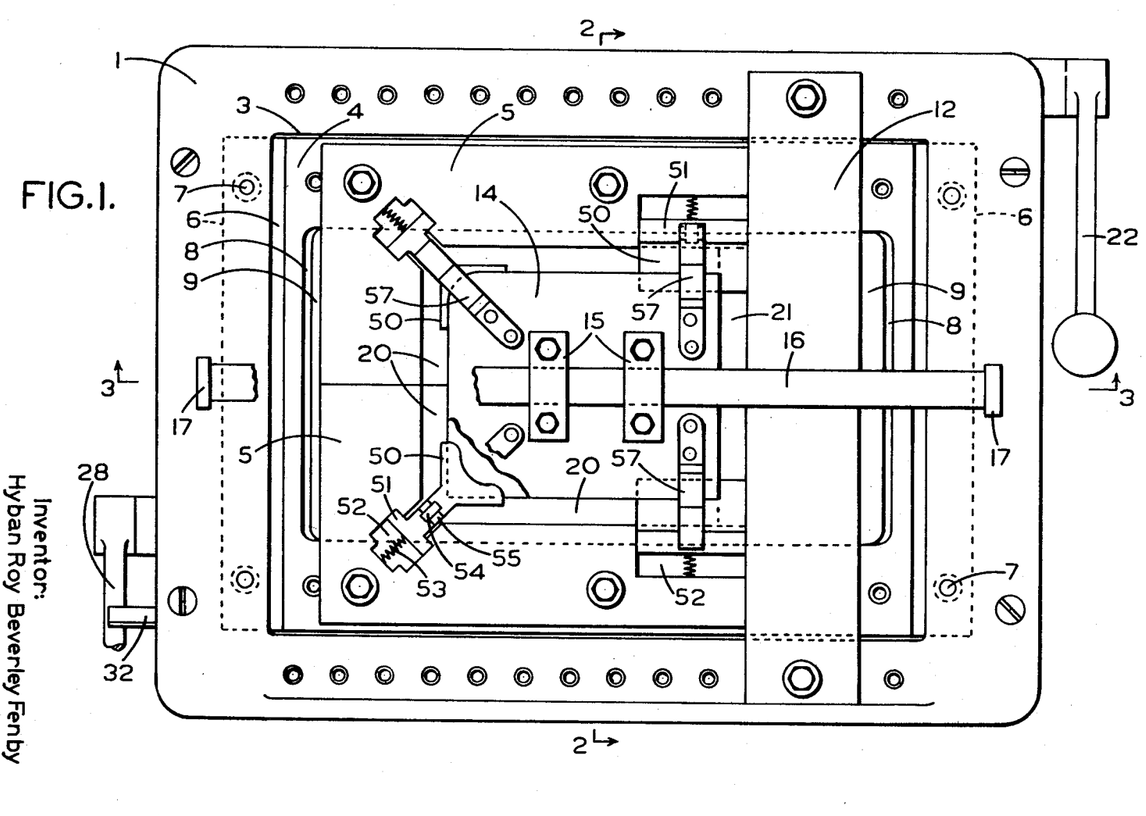
Figure 1 is a plan view of the frame of a turning machine according to this invention being a view in the direction of the arrow A of Figure 2.
Figure 2:
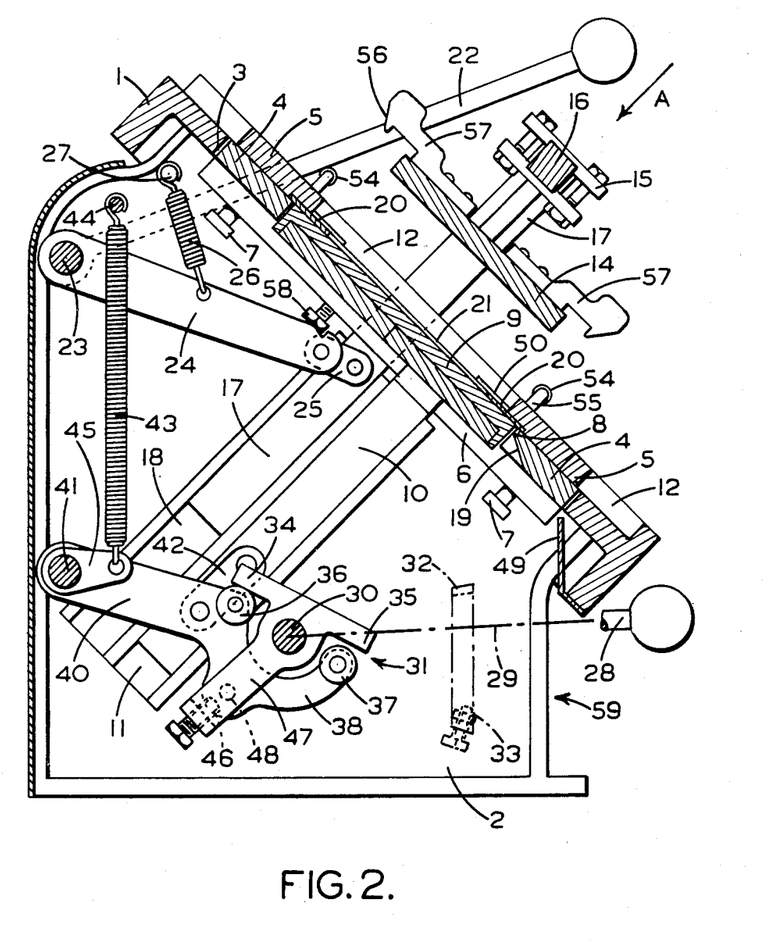
Figure 2 is a cross sectional end elevation on the line 2—2 of Figure 1.

Referring to Figures 1 and 2 the manually operated machine comprises a base structure which includes a frame 1 fixedly mounted in an inclined position on supports which may take the form of end members 2, one of which is shown in Figure 2, the angle of inclination of the frame 1 being of the order of 45°.

The frame 1 is provided with a rectangular opening 3 which accommodates a carrier frame or plate 4 for some of the female die members 5, the carrier 4 having flanges 6 at each end which extend under the end portions of the frame 1 and slidably engage headed studs 7 depending from the latter so that the carrier 4 is able to drop a limited distance relative to the frame 1. The carrier 4 is provided with a rectangular opening 8 to accommodate a hot plate 9 which is mounted on slide bars 10, one of which is shown in Figure 2 and which slides in a guideway 11 provided on the end support member 2. In accordance with usual practice the hot plate incorporates an electric heating element and connections the details of which are not shown, or the plate may be gas or otherwise heated.

For turning pockets the frame 1 is, as shown, provided with a transverse female die member 12 bolted to the frame 1 and is hereinafter referred to as the fixed female die member 12 and is for effecting turning of the top edge of the pocket.

In order to effect turning of the sides and bottom of the pocket a set of two complementary female die members 5 in the form of L-shaped plates are provided bolted to the carrier 4 and hereinafter referred to as the movable female die members. These movable female die members 5 overlap the hot plate 9 so that the carrier 4 is thus supported by the latter except at certain instances during the operation of the machine, i. e. when the carrier 4 abuts the head of the studs 7.

The male or shaper die is carried by brackets 15 depending from a cross-bar 16 which is in turn carried by slide bars 17 slidable in the end supports 2 for the frame 1 by means of guideways, one of which is shown at 18 in Figure 2. The male die 14 is shaped to the form of the pocket and is adapted to have a small clearance fit between the edge blades 20, 21 of the fixed and movable female die members 5, 12 respectively when lowered against the hot plate 9, the female die members with their edge blades 20, 21 together constituting the female die and providing a complementary opening for the male die 14 over the hot plate.

The slide bars 17 for the male die 14 are operated by a hand lever 22 which is fast with a shaft 23 having an arm 24 extending therefrom, the free end of the arm being pivotally connected by a link 25 to the slide bar 17, shown in Figure 2. The arm 24 is acted upon by spring means such as a tension spring 26 connected between it and a fixed anchorage 27 in order to urge the male die 14 to the in-operative position shown in Figure 2.

Each slide bar 10 to the hot plate 9 is operated by a hand lever 28 which, as indicated by the chain dotted line 29 in Figure 2 and shown at the left hand end of the frame 1 in Figure 1, is fast with a shaft 30 which carries fixed thereon a T-shaped lever 31. The hand lever operates between upper and lower stops 32, 33 indicated in chain dotted lines in Figure 2, and as shown in Figure 1, are provided at the left hand end of the machine. The arms 34, 35 of the T-shaped lever 31 are each adapted to bear upon rollers 36, 37 carried by a U-shaped part 38 of a lever 40 which is in turn mounted on a rotatable shaft 41. The lever 40 is pivotally connected by a link 42 to the corresponding slide bar 10 for the hot plate 9, which latter is urged upwardly in the direction of the male die 14 by spring means such as a series of tension springs, one of which is shown at 43 in Figure 2 connected between a fixed anchorage rod 44 and an arm 45 fast with the shaft 41 so that the lever 40 is urged in an anti-clockwise direction.

The T-shaped lever 31 enables two-way control of the hot plate 9 to be effected by means of the hand lever 28 since if the latter is raised against its upper limit stop 32 the arm 34 thereof bears on the roller 36 depressing the lever 40 to lower the hot plate 9. However, the extent to which the hot plate 9 can be lowered in this way by upward movement of the hand lever 28 is limited by the fact that such upward movement brings a stop 46 carried by the lower end of the stem 47 of the T-shaped lever 31 under a stud 48 carried by the base of the U-shaped part 38, abutment of the stud 48 with the stop 46 limiting the clockwise movement of the lever 40 whereby the hot plate 9 is lowered.

On the other hand if the hand lever 28 is pushed down the other arm 35 of the T-shaped lever 31 bears on its cooperating roller 37 to also move the lever 40 in a clockwise direction, whilst at the same time the stem 47 and stop 46 carried thereby moves clear of the stud 48 so that the movement of the lever 40 is no longer restricted except that it cannot be operated beyond a certain extent due to the fact that the hand lever 28 abuts the lower limit stop 33. However, it will be seen that by downward movement of the hand lever 28, the hot plate 9 is lowered to a considerably greater extent than by the upward movement of said lever.

In order to give a balanced operation of the hot plate 9 and male die 14 in addition to providing slide bars 10, 17 in guideways 11, 18 in each end support 2, the lever mechanisms shown in Figure 2 are preferably duplicated one at each end of the machine whilst the shafts 23, 30 and 41 are journalled at their ends in each support member 2.

The machine is also shown as incorporating turning members 50 for facilitating folding of the turn over of the pocket at the corners thereof, these corner turning members 50 being carried by slides 51 operating in recesses 52 in the movable female die members 5. Each turning member 50 is urged in the turning direction by a compression spring 53 acting between the end of the recess 52 and the slide 51, which latter carries a roller 54 in an upstanding fork 55 for co-operation with the inclined end face 56 of a corresponding arm 57 carried by the male die 14 and extending over the edge of the latter. The action is such that each time the male die 14 is lowered against the hot plate 9 the turning members 50 are moved back to an inoperative position onto the edge blades 20 of the movable female die members 5.

The sequence of operation of the machine is as follows:

In order to turn a pocket a previously cut piece of material 60 (Figures 3 to 6) is placed in the opening formed by the female die members 5, 12, the turned over portions of the cut piece of material resting on the edge blades 20, 21 of the latter and over the actual female die opening bounded by said edge blades.

Figure 3:
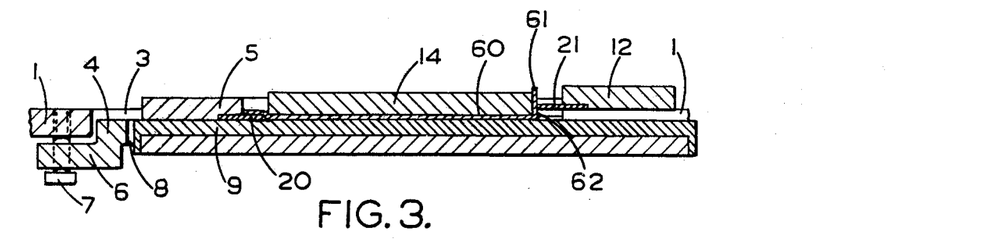
Figures 3 to 6 are cross sectional detail views taken on the line 3—3 of Figure 1 showing the sequence of operation of the dies and hot plate.
Figure 4:
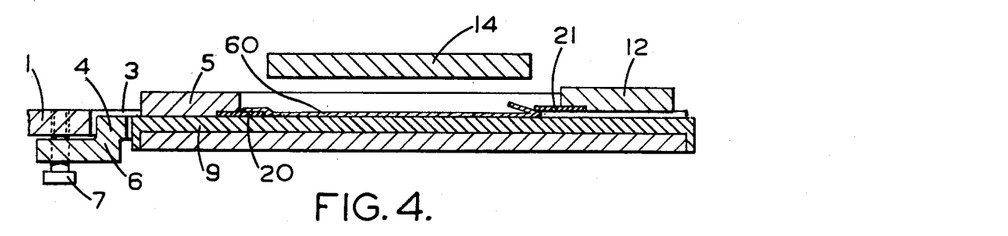

The hand lever 22 is pulled down to bring the male die 14 on to the material and press it against the hot plate 9 and thrust the material into the said female die opening. As pressure is applied in this way the hand lever 28 is raised against its upper limit stop 32 to lower the hot plate 9 to the extent indicated in Figure 3 which causes initial turning of the edge portion 61 between an adjacent edge of the male die 14 and the edge of the blade 21, said edges being thus positioned edge to edge during the operative location of the male die in the female die opening and against the hot plate. Owing to the length of the studs 7 the carrier 4 with the movable female die members 5 thereon drops with the hot plate 9 so that these movable die members 5 remain in contact with the latter, but on the other hand a gap is formed between the hot plate 9 and the fixed female die member 12 (Figure 3).

Pressure on both hand levers 22, 28 is then eased with the result that the hot plate 9 rises under the action of the springs 43 and due to the edge portion 61 being held between the blade 21 and corresponding edge of the male die 14, the rising hot plate causes a spreading of the initial turn of the material at 62 (Figure 3) under the edge plate 21 of the fixed female die member 12 and as the pressure is further eased and the male die 14 raised clear (Figure 4) the said initial turn is trapped or pinched between the hot plate 9 and the edge blade 21 of the fixed female die member 12.

This constitutes the first stage of the turning operation whereby the top edge of the pocket is turned in accordance with this invention.

Figure 5:
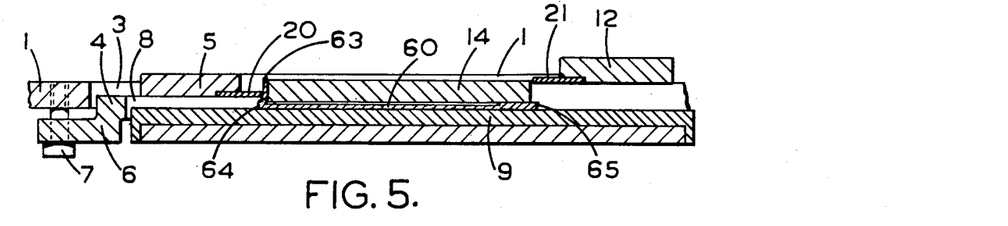
Figure 6:
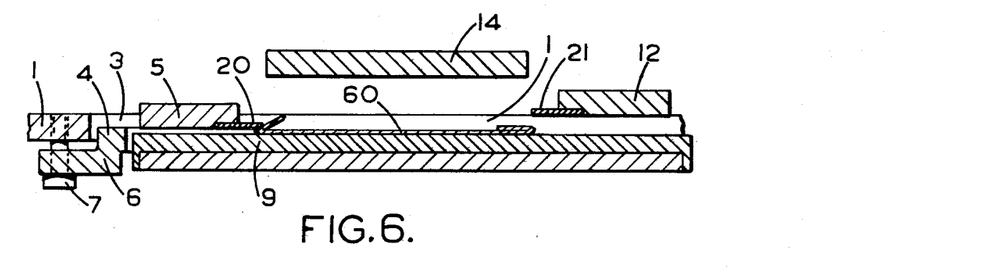

In order to effect the second stage of the turning operation whereby the sides and bottom of the pocket are turned the hand lever 22 is pulled down again to bring the male die 14 in contact with the material on the hot plate 9 (Figure 5). As pressure is thus again applied the hand lever 28 is moved downwards to permit the hot plate 9 to yield to a greater extent with the male die 14 with the result that a clearance is created between the hot plate 9 and the edge blades 20 of the movable female die members 5 owing to the fact that the dropping movement of the carrier 4 is checked by the heads of the studs 7. Here again, as pressure is eased on the hand levers 22, 28 the initial turn of the edge portion 63 between the male die 14 and blade 20, spreads at 64 under the edge blades 20 of the movable female die members 5 to be trapped or pinched under the latter as the hot plate rises, see Figure 6. During this second application of the male die 6 the initially turned top edge of the pocket is subjected to a pressing as at 65.

In order to finally complete the operation the male die 14 is brought down for a third and final application by the hand lever 22 to press the remaining initially turned edges of the material 60 against the body of the latter on the hot plate 9. However, this application may be omitted as in cases where creasing only of the side and bottom edges is required.

In order to discharge the turned pocket the hand lever 22 is raised to its maximum extent which causes the free end of the arm 24 (Figure 2) to abut a stop 58 on the under side of the carrier 4 to hold the latter against dropping movement, meanwhile the other hand lever 28 is pushed down to lower the hot plate 9 to its maximum extent so that the turned pocket may slide off the latter, being deflected by the chamfered lower edge 19 of the carrier and also by the deflector plate 49 on the lower edge of the frame 1, to drop out at the forward open side of the machine at 59.

In practice the above described operations of the hand levers 22, 28 are readily carried out with great rapidity giving a high rate of production of turned material.

In addition to accommodating the initial overlap of the edge portions of the material 60 the edge blades 20, 21 of the female die members 5, 12 together with adjacent edges or walls of the male die 14 serve to restrain or hold the initially turned edge portions of the material against upward movement with the male die 14 and thus promote a spreading of the initial turn under the blade edges to ensure the trapping or pinching.

It will be appreciated from the foregoing that the carrying out of the turning operation in two stages results in the side edges of the pocket being subsequently turned over an already turned and pressed top edge portion giving a neat finish at the corners.

Figure 7:
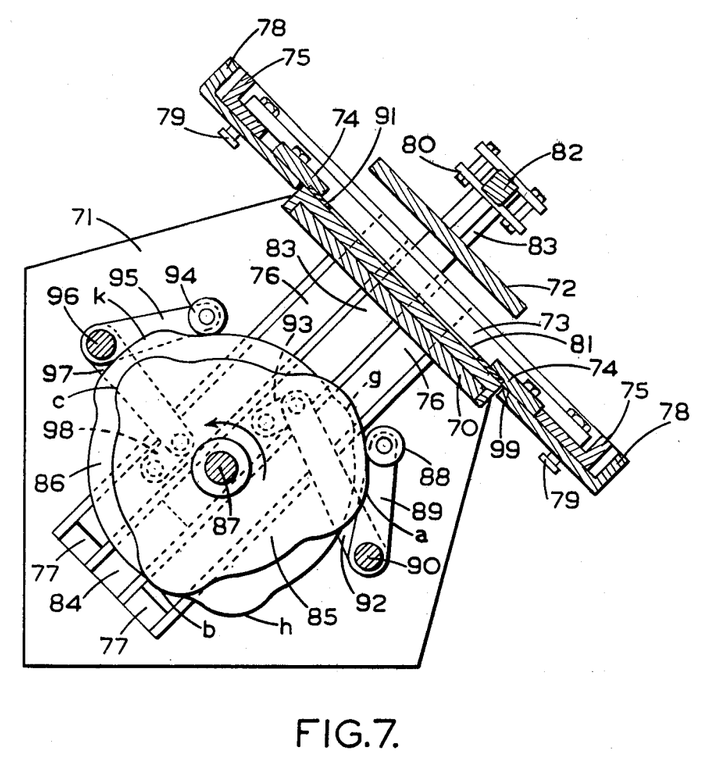
Figure 7 is a cross sectional elevation similar to Figure 2 of a power driven machine embodying the present invention.

Referring to Figure 7 an embodiment of this invention is shown wherein the hot plate 70 is fixedly mounted on end supports (one of which is shown at 71 in the figure) whilst the male die 72 and female die members 73, 74 are cam operated.

In the case of a machine for turning pockets one of the female die members 73 (corresponding to the female die member 12 shown in Figures 1 to 6) is carried by a carrier frame 75 secured to the upper ends of slide bars 76 operating in guideways 77 provided on the end members 71. The remaining female die members 74 to complete the female die, (i. e. those corresponding to the set of female die members 5 of Figures 1 to 6), are carried by a second carrier frame 78 which slidably engages headed studs 79 depending from the first carrier frame 75 and when not supported by the studs 79 is supported by the hot plate 70 due to the fact that the female die members 73, 74 rest on the latter, as shown in Figure 7.

The male die 72 is carried by brackets (one of which is shown at 80 in the figure) from a cross-bar 82 in turn carried by end slide bars one of which is shown at 83 located in a guideway 84 provided on the end member 71.

The dies are operated in timed relationship relative to the fixed hot plate 70 by cams consisting of a male die operating cam 85 and a female die operating cam 86, both said cams being fast with a common cam shaft 87 journalled in suitable bearings (not shown), and either manually rotated but preferably power driven such as by means of an electric motor through a reduction gear and clutch.

In the case of the male die operating cam 85 a follower roller 88 bears on its periphery whilst the follower itself 89 is carried by a shaft 90 which also carries fast therewith an arm 92 which is pivotally connected by a link 93 to the slide bar 83 for the male die 72, the weight of the latter and the supporting means therefor maintaining the roller 88 in constant contact with the periphery of the cam 85.

A follower roller 94 similarly contacts the female die operating cam 86, the follower itself 95 being fixedly carried by a shaft 96 which in turn carries fast therewith an arm 97 pivotally connected by a link 98 to one of the slide bars 76 secured to the carrier frame 75.

The above described cam mechanism and slide bars are preferably duplicated at each end of the machine to give a balanced operation of the dies whilst the shafts 87, 90 and 96 are journalled at their outer ends in the end supports 71.

The operation of the machine for effecting turning in two stages is as follows:

The cams rotate in an anti-clockwise direction as indicated by the arrow and the action of the cam 85 is such that the follower roller 88 descends the rise $a$ to cause the male die 72 to be brought down against a previously cut piece of material placed in the complementary opening formed by the female die members 73, 74 in order to press the material against the hot plate 70.

During this initial pressing the follower roller 94 mounts the rise $g$ on the cam 86 causing the carrier frame 75 to be lifted so that the female die member 73 is raised from the hot plate 70. This causes initial turning of the edge portion of the material adjacent said female die member 73 and upon the latter returning against the hot plate 70 the edge portion is held and the spread of the initial turn thereof is trapped or pinched between the said female die member 73 and the hot plate 70. As this trapping is effected the roller 88 mounts the rise $b$ of the cam 85 and causes the male die 72 to be raised and as this rise $b$ is left the male die 72 is lowered for further application against the material to press the already trapped edge portion against the body of the material to complete the first stage of turning.

During this second application of the male die 72 the roller 94 mounts the second rise $h$ on the cam 86 to lift the carrier 75 to a greater extent than before such that the lost motion afforded by the studs 79 is taken up and the second carrier 78 lifted to raise the female die members 74 carried thereby from the hot plate 70. This effects initial turning of the remaining edge portions of the material and as the female die members 74 return against the hot plate 70 due to the roller 94 leaving the second rise $h$ on the cam 86 the spread of the initial turn of these edge portions is trapped in a similar manner to that already described.

In the example shown the male die 72 is raised by the rise $c$ on the cam 85 and then allowed to descend for a third and final application to complete the second stage of the whole turning operation. However, this final pressing may be omitted if so desired.

After turning and any final pressing the roller 94 mounts the prolonged rise $k$ on the cam 86 which is such as to cause both carriers 75, 78 to be raised so that the female die members 73, 74 carried thereby are raised clear of the hot plate 70. This allows the turned pocket to slide off the hot plate 70 for discharge at the front of the machine, the front edge of the opening in the carrier frame 78 being chamfered at 99 to assist in deflecting the turned pocket in a downward direction as it leaves the hot plate 70.

As in the case of the machine described with reference to Figures 1 to 6 the female die members 73, 74 have edge blades 81, 91 respectively for actual operative engagement with the cloth whilst corner turning members may also be provided if desired.

Figure 8:
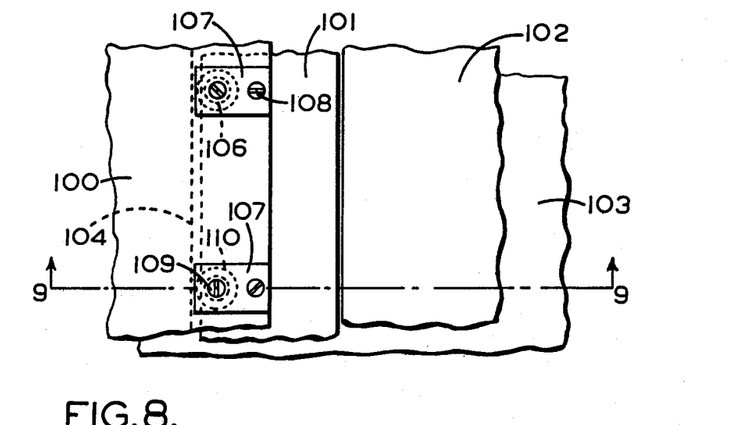
Figure 8 is a detail plan view on an enlarged scale of a refinement whereby varying thicknesses of material to be turned are automatically accommodated and Figures 9 and 10 are detail cross sectional views on the line 9—9 of Figure 8 showing the construction and operation of the refinement.
Figure 9:
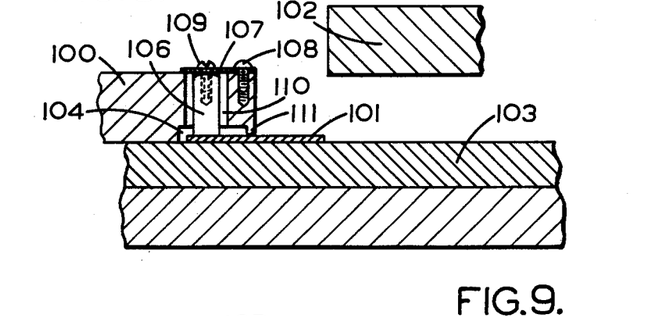
Figure 10:
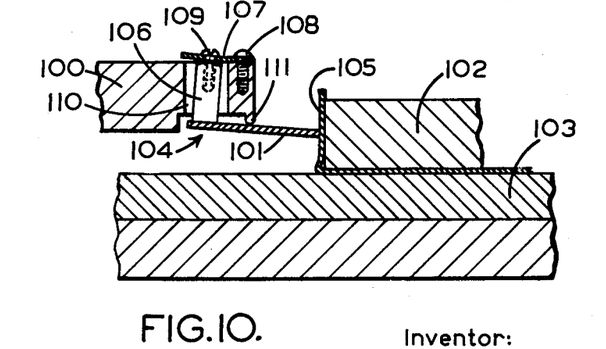

In a refinement shown in Figures 8–10 as applied to a female die member 100 the latter is modified to carry its edge blade 101 for yielding movement in order to accommodate varying thicknesses of material as the male or shaper die 102 thrusts material against the hot plate 103.

Where, as is shown, the edge blade 101 is carried by the female die member, the said edge blade is mounted for yielding movement from its normal position in the direction of movement of the male die 102 towards the hot plate 103 but is adapted to be non-yielding in the opposite direction from said normal position.

For this purpose the edge blade 101 consists of a strip of relatively thin but rigid metal plate and has a part thereof accommodated in an undercut recess 104 in the body of the female die member 100 such that the remainder of the blade extends from the die for actual contact with the material 105 (Figure 10).

The part of the blade 101 accommodated in the undercut recess 104 is acted upon by spring means and for this purpose it may be connected at intervals along its length by a series of studs 106 extending through the female die member 100 to a corresponding series of blade springs 107 on top of said female die member. Instead of blade springs 107 the studs 106 or the like extending from the edge blade may be acted upon by compression or other suitable springs.

Each blade spring 107 is secured at or near one end by a screw 108 to the top of the female die 100 preferably near the edge of the latter from which the edge blade 101 extends, whilst the other end of the blade spring 107 is secured by a screw 109 which enters the stud 106 extending from the edge blade 101 through a hole 110 in the die member 100 which hole is of sufficient size for allowing the necessary freedom of movement of the stud 106.

The outer edge of the undercut recess 104 has a depending rib 111 against which the edge blade 101 abuts at approximately the mid point of its width and the arrangement is such that the outer part of the edge blade can be moved downwardly for a limited extent owing to the fact that it is able to rock about the depending rib 111 and so impart upward movement to the stud 106 to in turn lift the blade spring 107 against the latter's inherent resiliency.

It will thus be apparent that the action of the blade spring 107 is to urge the edge blade to its normal position i. e. such that it lies in the same plane as the lower part of the female die member 100 and preferably flush with the under side of the latter. The arrangement also positively prevents upward movement of the edge blade 101 from its normal position since such movement tends to move each stud 106 downwardly through the die member 100 which movement is positively restrained owing to the abutment of each blade spring 107 against the top of the die member.

The downward yielding movement thus afforded to the edge blade 101 results in the opening formed by the female die member or members 100 being slightly enlarged when material 105 is thrust therein by the male die 102 whilst the fact that each blade 101 will not yield in the opposite direction from its normal position results in the initial fold of the material 105 being subsequently firmly trapped or pinched between the under side of the edge blade 101 and the hot-plate 103.

Once the machine has been set up with the edge blades 101 of the female die member or members 100 disposed so as to closely surround the male or shaper die 102, little or no resetting of the female die members is necessary for different thicknesses or kind of material e. g. nylon, rayon, cotton or linen cloth since the resilient action of the edge blade 101 automatically accommodated such variations in thickness.

It will be seen that the trapping or pinching of the material by means of machines according to this invention gives a more sharply defined turn or crease than hitherto obtained when the material was turned over a sharper plate or male die.

The machines are therefore particularly advantageous for use in turning crease resisting textile materials and in addition to the latter may be used for the turning or creasing of other sheet material such as paper, leather, plastic or the like in which case the plate 9 may not be required to be heated or adapted therefor.

By means of the machines it is possible to effect sharply defined creasing only especially for providing a crease line for guiding a stitcher in the well known "run and turn" method of manufacturing pockets, collars and the like.

I claim:

1. A turning or creasing machine comprising in combination a base structure; a plate carried by said base structure; a female die consisting of at least one female die member carried on said base structure immediately over the plate and provding an opening over the latter which opening is of a shape corresponding substantially to that of the material when turned or creased whilst said plate and female die are further carried on said base structure for relative movement apart and against one another in a direction at right angles to the planes of the opening and plate for pinching material only between them; a male die having a contour complementary to the shape of the female die opening for a small clearance fit therein and mounted on said base structure for limited movement relative to the plate and female die in order to enter said opening and operatively locate therein against the plate with edge to edge positioning of adjacent edges of the dies for thrusting a cut piece of material into said opening and against the plate to initially turn and hold at least one edge portion of the material between said adjacent edges for spreading and pinching of the held initial turn of the edge portion with a material contact directly between the female die and plate on and by said relative movement of the latter in order to crease the material for edge turning or creasing only thereof; and operating mechanism carried by said base structure for actuating the male die for its movement aforesaid and effecting said relative movement of the female die and plate.

2. A turning or creasing machine comprising in combination a base structure; a plate carried by said base structure; a female die consisting of at least two female die members carried on said base structure immediately over the plate and together providing an opening over the latter which opening is of a shape corresponding substantially to that of the material when turned or creased whilst each female die member and the plate are further carried on said base structure for successive relative movements apart and against one another in turn in a direction at right angles to the planes of the opening and plate for effecting successive pinching of material only between said plate and said female die members; a male die having a contour complementary to the shape of the opening formed by the female die members for a small clearance fit in said opening and mounted on said base structure for successive limited movements relative to the plate and female die members in order to successively enter said opening and operatively locate therein against the plate with edge to edge positioning of adjacent edges of the male die and female die members for thrusting a cut piece of material into said opening and against the plate to successively effect initial turning and holding of different edge portions of the material between corresponding adjacent edges of the male die and female die members for successive spreading and pinching of the held initial turns of the edge portions with a material to material contact directly between the female die members and plate on and by said relative movements of the latter in order to successively crease the material for edge turning or creasing only thereof in at least two stages; and operating mechanism for actuating the male die for its successive movements aforesaid and effecting said successive relative movements in turn of said female die members and plate.

3. A turning or creasing machine comprising in combination a base structure; a plate mounted for yielding movement on said base structure; a female die consisting of at least one female die member carried on said base structure immediately over the plate and providing an opening over the latter which opening is of a shape corresponding substantially to that of the material when turned or creased; means on said base structure yieldably urging said plate against the female die but allowing yielding movement of said plate away from said female die in a direction at right angles to the planes of the opening and plate for pinching material only between them; a male die having a contour complementary to the shape of the female die opening for a small clearance fit therein and mounted on said base structure for limited movement relative to the plate and female die in order to enter said opening and operatively locate therein against the yieldable plate with edge to edge positioning of adjacent edges of the dies for thrusting a cut piece of material into said opening and against the plate with yielding movement of the latter to initially turn and hold at least one edge portion of the material between said adjacent edges for spreading and pinching of the held initial turn of the edge portion with a material to material contact directly between the female die and yieldable plate on and by return movement of the latter in order to crease the material for edge turning or creasing only thereof; and operating mechanism carried by said base structure for actuating the male die for its movement aforesaid and effecting said yielding movement of said plate.

4. A turning or creasing machine comprising in combination a base structure; a plate fixedly mounted on said base structure; a female die consisting of at least one female die member carried on said base structure immediately over the plate and providing an opening over the latter which opening is of a shape corresponding substantially to that of the material when turned or creased whilst said female die is carried on the base structure for movement away from and against said fixed plate in a direction at right angles to the planes of said opening and plate for pinching material only between them; a male die having a contour complementary to the shape of the female die opening for a small clearance fit therein and mounted on said base structure for limited movement relative to the plate and female die in order to enter said opening and operatively locate therein against the fixed plate with edge to edge positioning of adjacent edges of the dies for thrusting a cut piece of material into said opening and against the fixed plate to initially turn and hold at least one edge portion of the material between said adajcent edges for spreading and pinching of the held initial turn of the edge portion with a material to material contact directly between the female die and plate on and by said movement of the female die away from and against the fixed plate in order to crease the material for edge turning or creasing only thereof; and operating mechanism carried by said base structure for actuating the male and female dies for their movements aforesaid relative to the fixed plate.

5. A turning or creasing machine comprising in combination a base structure; a plate mounted for yielding movement on said base structure; a female die consisting of at least two female die members and carried by the base structure immediately over the plate, one of said female die members being mounted thereon for limited movement with the plate on yielding movement of the latter, said female die members together providing an opening over the plate which opening is of a shape corresponding substantially to that of the material when turned or creased; means on said base structure yieldably urging said plate against each female die member but allowing movement of said plate away from each said female die member in turn in a direction at right angles to the planes of the opening and plate for successive pinching of material only between the plate and female die members; a male die having a contour complementary to the shape of the opening formed by the female die members for a small clearance fit in said opening and mounted on said base structure for successive limited movements relative to the plate and female dies in order to succesively enter said opening and operatively locate therein against the yieldable plate with edge to edge positioning of adjacent edges of the male die and female die members for thrusting a cut piece of material into said opening and against the plate with yielding movement of the latter to successively effect initial turning and holding of different edge portions of the materials between corresponding adjacent edges of the male die and female die members for successive spreading and pinching of the held initial turns of the edge portions with a material to material contact directly between the female die members and yieldable plate by successive return movements of the latter against said female die members in turn in order to successively crease the material for edge turning or creasing only thereof in two stages; and operating mechanism carried by said base structure for actuating the male die for its movement aforesaid and effecting yielding movement of said plate.

6. A turning or creasing machine comprising in combination a base structure; a plate fixedly mounted on said base structure; a female die consisting of at least two female die members each carried by the base structure immediately over the plate for movement away from and against the latter in turn in a direction at right angles to the plane of said plate to effect successive pinching of material only between said female die members and plate, said female die members together providing an opening over the plate which opening is of a shape corresponding substantially to that of the material when turned or creased; a male die having a contour complementary to the shape of the opening formed by the female die members for a small clearance fit in said opening and mounted on said base structure for limited movement relative to the plate and female die members in order to successively enter said opening and operatively locate therein against the fixed plate with edge to edge positioning of adjacent edges of the male die and female die members for thrusting a cut piece of material into said opening and against the fixed plate to successively effect initial turning and holding of different edge portions of the material between corresponding adjacent edges of the male die and female die members for successive spreading and pinching of the held initial turns of the edge portions with a material to material contact directly between the female die members and the fixed plate on and by said movement of each female die member in turn away from and against the fixed plate in order to crease the material for edge turning or creasing only thereof; and operating mechanism carried by said base structure for actuating the male die for its successive movements aforesaid and effecting successive movements in turn of the female die members relative to the fixed plate.

7. A turning or creasing machine according to claim 6 wherein one of the movable female die members is connected to the other of said female die members by lost motion means whereby initial limited movement of said first mentioned female die member relative to the fixed plate enables pinching of material to be effected between said first mentioned female die member and plate whilst greater relative movement of said first mentioned female die member takes up the lost motion means and actuates said other female die member relative to the plate for further pinching of material between said other female die member and plate.

8. A turning or creasing machine according to claim 1 comprising in combination therewith corner turning members carried by the female die member for movement thereon beyond said female die member to engage material being turned in order to assist turning at corners of the latter; spring means on said female die member for urging each said turning member for said movement when the male die is withdrawn from the opening formed by the female die member; and cam members carried by said male die for cooperation with said turning members to retract the latter to an inoperative position on the female die member on entry of the male die into the opening formed by said female die member.

9. A turning or creasing machine according to claim 1 comprising in combination therewith edge blades carried by at least the female die member for actual contact with the material during turning or creasing of the latter said edge blades being mounted on the female die member for restricted resilient yielding movement sufficient to accommodate and hold varying thicknesses of material between the adjacent edges of the male die and female die member on initial turning of said material when the male die enters and operatively locates in the opening formed by the female die member.

10. A turning or creasing machine according to claim 1 comprising in combination therewith edge blades carried by the female die member for actual contact with the material during turning or creasing of the latter, said edge blades being mounted on the female die member for restricted resilient yielding movement only in the direction of movement of the male die into the opening formed by the female die member and sufficient to accommodate and hold varying thicknesses of material between the adjacent edges of the male die and female die member on initial turning of said material, whilst said edge blades are further mounted for abutment against the female die member to prevent movement in the opposite direction for effecting spreading and trapping of material between the said female die edge blades and the plate whereby turning or creasing is effected.

References Cited in the file of this patent

UNITED STATES PATENTS

| | | |
|---|---|---|
| 1,172,343 | Clearwater | Feb. 22, 1916 |
| 2,609,129 | Goldberg | Sept. 2, 1952 |

FOREIGN PATENTS

| | | |
|---|---|---|
| 16,442 | Great Britain | July 17, 1911 |